J. M. DINKINS.
MEANS FOR CONTROLLING ELECTRICAL ENERGY.
APPLICATION FILED JAN. 22, 1914.
1,234,301.
Patented July 24, 1917.
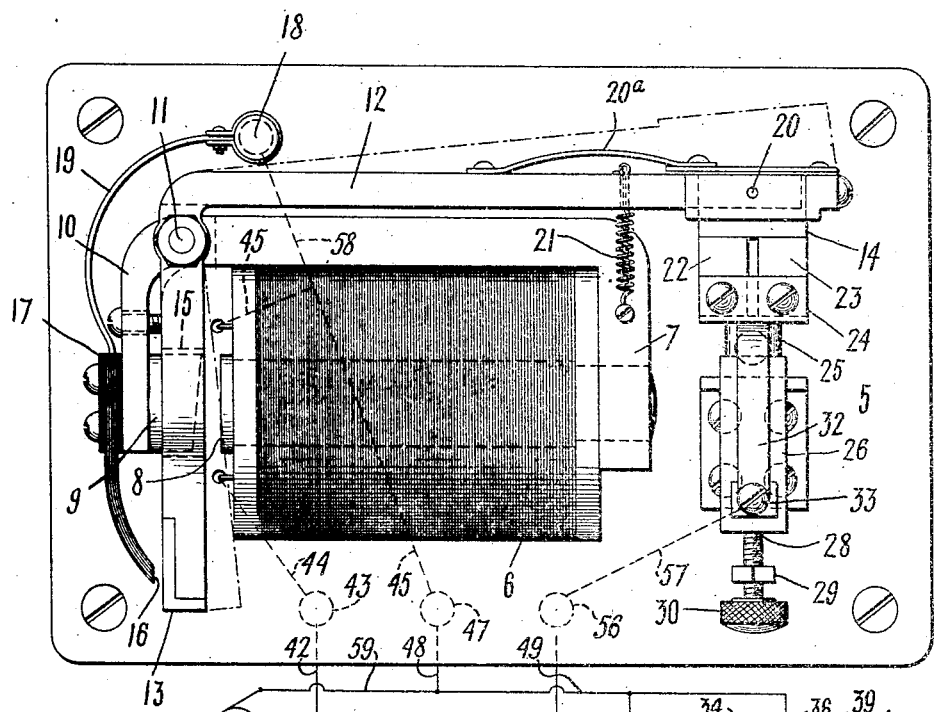

UNITED STATES PATENT OFFICE.

JOHN M. DINKINS, OF JERSEY CITY, NEW JERSEY, ASSIGNOR TO EDWARD V. HARTFORD, OF DEAL, NEW JERSEY.

MEANS FOR CONTROLLING ELECTRICAL ENERGY.

1,234,301.   Specification of Letters Patent.   Patented July 24, 1917.

Application filed January 22, 1914. Serial No. 813,656.

*To all whom it may concern:*

Be it known that I, JOHN M. DINKINS, a citizen of the United States, residing at Jersey City, in the county of Hudson and State of New Jersey, have invented certain new and useful Improvements in Means for Controlling Electrical Energy, of which the following, taken in connection with the accompanying sheet of drawings, is a full, clear, and concise description.

My present invention relates particularly to new and improved means for controlling electrical energy and one of the principal objects of my invention is to automatically interrupt the flow of electrical energy in such manner as to effect a transmission of full potential energy from its source to the work to be performed in predetermined impulses or what may be termed "a step-by-step fashion." No variation in current strength ensues from the operation of the magnetic controller, but a constant potential and full torque is obtained.

According to another phase of my invention, I have provided means for varying the length of the impulse. This regulatable means is preferably incorporated as a part of the magnetic controller and constitutes a new and novel part thereof. The automatic circuit breaking means is governed by a controlling switch under the control of the operator.

In carrying my invention into practice, I may employ, as illustrated, an electromagnetic cutout and a controlling switch interposed in the circuit between the source of electrical energy and the work to be performed. These two instrumentalities are coöperatively associated and arranged to work conjointly under certain operative functions of the controlling switch, the latter also being adapted to independently control the flow of energy under different functional operations. Several useful applications of my invention in the electrical art might be mentioned, such for instance as controlling the movement of electrically operated elevators, cars or vehicles. When so used, my invention may be conveniently associated with the brake applying mechanisms thereof.

These specified uses, however, are illustrative rather than definitive, and I do not wish to be understood as limiting myself thereto as other useful applications might readily be resorted to by those skilled in the art.

In the accompanying drawings, I have, by way of example, illustrated one embodiment of my invention, in which I have shown conventionally an electromagnetic controlling device (the structural details of which in and of themselves constituting novel features of invention) and diagrammatically a source of electrical energy, the components of an electric motor, a multiple contact controlling switch and wiring circuits, all of which instrumentalities are coöperatively arranged to enable the carrying out of the objects of the invention.

Figure 1 illustrates, in plan, the details of an electromagnetic controlling device as referred to above and other mentioned instrumentalities, while Figs. 2 and 3 illustrate end detail views of parts of said electromagnetic controlling device.

Fig. 4 is a view in perspective of the manually-operated controlling switch.

In the embodiment illustrated, I employ electromagnetic controlling means to measure, as it were, the amount of electrical energy, which is permitted to pass to the point of place where it is utilized to perform work.

Referring in detail to the drawings, 1 and 2 indicate the armature and field of an electric motor respectively, which, for a full understanding of the manner in which my invention may be carried into practice, I illustrate and designate as the work which the electrical energy performs. 3 indicates a suitable electrical storage battery or source of electrical energy. 4 designates a multi-contact switch, which controls the operation of the electro-magnetic controlling device 5. All of these instrumentalities are coöperatively associated and operate conjointly through the medium of the required circuits as shown.

When my invention is employed for controlling the application of vehicle brakes, I arrange the magnetic controlling device with relation to the other instrumentalities described, so that it is brought into operation only when it is desired to apply the brakes gradually, on the other hand, when a quick application of the brakes is desired, to bring the vehicle to a sudden stop, the magnetic controller is cut out. This is accomplished by providing the switch 4 with emergency contacts and the necessary wiring circuits.

It will be understood that any suitable brake applying mechanism (not shown) may be connected with the motor and operated thereby, and I have not considered it necessary to illustrate or describe the same merely mentioning this application or use of my invention by way of example as heretofore indicated. The switch 4 is also provided with the necessary contacts and wiring circuits to change or reverse the direction of rotation of the motor armature to effect a release of the vehicle brakes and this in either a like step-by-step gradual fashion or by an abrupt or quick action.

The electromagnet 6 is supported in a frame 7, the latter being fast to a suitable base or support. Coöperating with the core 8 is a movable member 9, the latter being carried by an arm 10, pivoted upon a post 11 fast to the base. The arm 10 is moved under the influence of the magnetic attraction of the magnet 6, as will be presently explained. Also pivotally mounted upon the post 11, I provide a contact carrying lever of bell-crank formation 12, one end of which is provided with a contact 13 and the opposite end with a contact 14. The arm carrying the contact 13 is provided with an orifice or hole 15, through which the armature 9 is permitted to move when attracted by the magnet 6. The arm 10 also carries a contact 16 of laminated spring construction, the same being insulated therefrom at 17, as shown. The contact 16 is connected to a binding post 18, fast to the base or support, this connection being by means of a flexible spring or wire 19. The end of arm 12 which carries the contact 14 is arranged to slightly oscillate independently thereof by means of a pivoted connection 20. This arm is normally in its retracted or contacting position and is held in this position by means of an expansion spring 21 which is attached to the frame 7. 21ª indicates a spring which is mounted upon the post 11, one end of which bears against the arm 12, and to the opposite end against the underside of the arm 10 exerting a spring tension to normally keep these arms separated to their fullest extent, thus assuring normally an open circuit condition between the contacts 13 and 16.

22 and 23 indicate carbon contacts which coöperate with the contact 14 to effect the passage of current to the oscillating arm 12 when the latter is in its initial retracting position. These twin contacts are held in a movably mounted holder 24. This holder is carried by a plunger 25 reciprocally mounted in a cylindrical casing 26, which is supported upon a channel support 27, the latter being fast to the base. Projecting from the rear end of the plunger 25 is a screw-threaded shank 28 having a limiting stop in the form of a nut 29 threaded thereon. At the end of the threaded shank 28 is a knob 30 by means of which proper adjustments are effected. Within the cylindrical casing 26 and surrounding the threaded shank 28 and interposed between the plunger 25 and the end of the casing 26 is a spiral expansion spring 31 which exerts its spring tension to project the plunger 25 and move the contacts 22 and 23 outwardly, so that they will follow the contact 14 when the arm 12 oscillates outwardly. The extent of this following movement, as can be seen from the drawing, is regulated by the stop nut 29. The spring 31 is of less tension than the spring 21, so that the latter is powerful enough to retract the arm 12 and through the engagement of contact 14 with contacts 22 and 23 cause the latter to move rearwardly toward the spring 31. In this manner the length of the impulse of the electrical energy is controlled. 32 represents a light flexible spring contact affording a conductive path from the binding post 33 to the holder 24 and the carbon contacts mentioned.

The electric switch 4 is of a knife blade type and comprises knife blades $a$, $b$ and $c$, the latter two being electrically connected at $d$. The knife blade contacts, or arms $a$ and $c$ are pivoted to the contacts 34 and 35 and are arranged to be swung into contact with the four pairs of adjacent contacts, two pairs being arranged to the right and two pairs to the left of the pivotal connection. The pairs of contacts to the right of the pivotal connection coöperate with the arms to cause the flow of energy in one direction to the motor, while the contacts to the left operate in connection with the switch to reverse the flow of current to the motor and thus change its polarity. On either side of the pivotal points of the switch are arranged a central contact which coöperates with arm $b$ of the switch, these contacts control the energization of the electromagnet 6.

The first pair of right hand contacts are indicated by the numerals 36 and 37 and the right hand central contact by the numeral 38. The second pair of right hand contacts are indicated by the numerals 39 and 40. These latter contacts are much shorter or are arranged in a lower plane than the contacts 36 and 37 in order that the switch may be thrown into connection with contacts 36 and 37 without engaging contacts 39 and 40. Assuming that the switch has been thus operated the knife blade $a$ will be in contact with contact 36 and the knife blade $b$ will be in contact with contact 38 and knife blade c will be in contact with contact 37. The flow of electrical energy will be as follows:

Starting from battery via leads or wires 41 and 42 to binding post 43, wire 44 to magnet 6, from magnet 6 via wires 45 and 46 to binding post 47, wires 48, 49, 50 and 51 to contact 38, to arm b, connecting strip d to arm c, to contact 35, to wire 52, to field 2 of motor, through wire 53 to battery 3, thus completing the magnet energizing circuit. The energization of magnet 6 exerts a pull on member 9 until it contacts with the end of the magnet core 8. In this downward movement the contact 16 is first brought into contact with the end 13 of the arm 12. This closes the motor energizing circuit as follows:

From battery 3 via wires 41 and 54 to contact 34, switch arm a to contact 36, wire 55 to binding post 56, wire 57 to binding post 33, to carbon contacts 22, 23 and 14, arm 12 to contact 13, to contact 16, flexible connection 19, binding post 18, wire 58 to contact 47, to wire 59, to motor armature 1, to wire 60, to contact 37, to switch arm c, to contact 35, to wire 52, to field 2, wire 53 to battery 3, thus completing the motor energizing circuit. As the magnet 6 during its energization exerts a further pull upon member 9 causing both arms 10 and 12 to move toward the magnet, connection between contacts 13 and 16 having been made is so maintained as long as arm b is on contact 38. As the arm 12 is moved toward the magnet the opposite end of arm 12 carrying contact 14 is oscillated upwardly thus breaking connection with contacts 22 and 23 and interrupting the flow of current to the motor. The magnet, however, is still in circuit with the battery and its energization is maintained so long as the electric switch 4 is in this position.

It will be understood from the description thus far that the electro-magnetic controller operates to control the flow of electrical energy from the battery to the motor, in a predetermined impulse, which impulse is regulated by the time interval in which the carbon contacts 14, 22 and 23 are in engagement with each other. This impulse can be lengthened or shortened by means of the adjusting nut 29 being moved along the screw threaded shank 28. By moving the adjusting nut 29 toward the knob 30, greater movement of the contacts 22 and 23 is permitted upon the swing of the arm 12 carrying the contact 14, as they will follow the latter until the adjusting nut 29 engages the end of the cylindrical casing 26, at which time the contact 14 will move away from contacts 22 and 23, a break in the circuit ensues. The meeting faces of contacts 14, 22 and 23 are maintained in the common plane in full contact, as long as they are together, owing to the pivoted connection of the contact carrying end of the arm 12, which permits that end to bend toward the contacts 22 and 23 under the tension of the spring $20^a$. It is likewise apparent that so long as the arm b is on the contact 38, the magnet 6 is energized thus maintaining a broken circuit between the contacts 14, 22 and 23.

By opening the switch 4, the current ceases to flow to the magnet and the energization thereof ceases immediately. The arm 12 is retracted under the action of spring 21 causing the contacts 14, 22, and 23 to reëstablish the electrical connection therebetween. The opposite end of the arm 12 likewise moves into its initial-shown position. The arm 10 carrying the laminated spring contact 16 also assumes its initial-shown position under the influence of spring $21^a$.

A repetition of closing the magnetic circuit and the establishment of the motor energizing circuit by the operation of the switch 4 repeats the operation just described. In this manner, the flow of electricity may be periodically controlled so that the same may flow to the motor or work in stated impulses. As heretofore pointed out, a control of the movement of elevators or the application of brakes to moving vehicles may be regulated to a nicety in a slow and gradual movement. Should, however, it be desired to feed the current to the motor or work continuously for any length of time in order, for instance, to apply the vehicle brakes abruptly, I have arranged for this by providing the emergency contacts 39 and 40 and a convenient circuit by which the electro-magnetic controlling device is cut out and rendered inoperative. The operation of this phase of the invention is as follows:

The switch 4 is operated to bring into contact the knife-blades a and c with the contacts 39 and 40, thus establishing a circuit from battery 3 via wires 41, 54, contact 34, switch arm a, contacts 34 to 39; via wires 49, 59, motor armature 1, wires 60 and $60^a$, switch arm c, contact 35, wire 52, motor field 2, wire 53 to battery 3, thus completing the motor energizing circuit. In this position of the switch 4, the motor is operated until the switch is opened to break connection between it and the contacts described.

In order to operate the motor in reverse direction so as to release the brakes of the vehicle in a like step-by-step fashion when my invention is used in connection therewith, contacts 61, 62 and 63 are provided. When the switch is thrown onto these contacts, similar circuits as heretofore described are established, the flow of current, however, is in a reverse direction. The electro-magnet operates in the same manner, as heretofore described to control and cause the flow of current to the motor or work in predetermined impulses. In order to cut out the electromagnetic control, emergency contacts 64 and 65 are provided which are similar to the contacts 39 and 40. When the switch is in contact with these contacts, the motor energizing circuit is established with the current also flowing in the reversed direction. It is thought unnecessary to describe the reversing circuits in view of the description heretofore given. It is thought these circuits are clearly indicated and are apparent from an inspection of the drawings.

It will be observed from the foregoing that the electromagnetic controller automatically operates sequentially first to establish the motor energizing circuit and thereafter to break said circuit. The time in which it takes to make and break this circuit is regulatable, as heretofore described, thus the length of the impulse or amount of electrical energy permitted to pass to the motor or work is predetermined. It will be understood that the frequency of the impulse as well as the length of the impulse is regulatable.

Having thus described my invention what I claim as new herein and desire to secure by Letters Patent is:

1. In combination, a source of electrical energy, a motor, a plurality of energizing circuits for said motor each of which include said source of energy, means for closing one of said circuits for a predetermined interval of time, means for indefinitely closing another of said circuits, and means whereby the direction of the flow of current over said circuits may be predetermined.

2. In combination, a source of electrical energy, an electro-magnetic controlling device controlling the flow of electrical energy from said source, an electrical switch in the circuit and controlling the operation of the electro-magnetic controlling device, whereby the latter is operative to cause a flow of current from the source of energy for a predetermined time interval when the switch is in one position, said switch adapted when in a different position to allow a continuous flow of energy from said source.

3. In combination, a source of electrical energy, a multi-contact switch adapted to control the direction and duration of the flow of electrical energy from said source, an electro-magnetic controlling device interposed in said circuit and operating to control the flow of energy from said source when the switch is closed to energize said electro-magnet, and a contact make and break device controlled by said magnet operating to allow the current to flow for a predetermined time interval.

4. An electro-magnetic controlling device for controlling the flow of electrical energy including in combination an electro-magnet, conductor parts providing a path or flow for the current, said conductor parts including contact make and break devices, one of said devices being operated through the energization of said magnet to make contact to complete a circuit, the other of said devices being operated to break contact to interrupt said circuit, the said make and break between the respective pairs of contacts being sequential and adjustable for varying the time interval necessary to separate the contacts of one of said devices.

5. An electro-magnetic controlling device comprising circuit establishing contacts operating to make contact under the influence of the energization of the magnet and circuit interrupting means, operating to break said circuit under the influence of the energization of the magnet, said circuit establishing contacts and circuit breaking means operating sequentially to provide for the passage through said circuit of electrical energy in predetermined impulses.

6. An electro-magnetic controlling device comprising circuit establishing contacts operating to make contact under the influence of the energization of the magnet and circuit interrupting means, operating to break said circuit under the influence of the energization of the magnet, said circuit establishing contacts and circuit breaking means operating sequentially to provide for the passage through said circuit of electrical energy in predetermined impulses, and regulatable means for varying the length of said impulses.

In witness whereof I have hereunto set my hand in the presence of two subscribing witnesses.

JOHN M. DINKINS.

Witnesses:
 WM. C. DUNN,
 P. FRANK SONNEK.

Copies of this patent may be obtained for five cents each, by addressing the "Commissioner of Patents, Washington, D. C."